UNITED STATES PATENT OFFICE.

PAUL EHRLICH, OF FRANKFORT-ON-THE-MAIN, AND BAPTIST REUTER, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

PREPARATION FROM ALKALI SALTS OF THE 3.3¹-DIAMINO-4.4¹-DIOXYARSENOBENZENE AND PROCESS OF MAKING SAME.

1,078,135.      Specification of Letters Patent.      Patented Nov. 11, 1913.

No Drawing.      Application filed November 15, 1912. Serial No. 731,612.

*To all whom it may concern:*

Be it known that we, PAUL EHRLICH, M. D., professor of medicine, and BAPTIST REUTER, Ph. D., chemist, citizens of the Empire of Germany, residing at Frankfort-on-the-Main and Höchst-on-the-Main, Germany, respectively, have invented certain new and useful Improvements in a Preparation from Alkali Salts of the 3.3¹-Diamino-4.4¹-Dioxyarsenobenzene and Process of Making Same, of which the following is a specification.

The alkali salts of the arsenophenols and their derivatives, as, for instance, of 3.3¹-diamino-4.4¹-dioxyarsenobenzene are of great value for therapeutic purposes, for instance as a remedy for syphilis; however, when in an isolated condition, they are not stable and the products formed from them by decomposition are highly toxic. Now we have found that the mixtures of said alkali salts with reducing agents, such as hydrosulfites or sulfoxylates, are obtainable by mixing the solutions of said compounds with solvents, which precipitate both the said alkali salts and the reducing agents, and are comparatively much more stable and therefore of particular value for therapeutic purposes. When working with 3.3¹-diamino-4.4¹-dioxyarsenobenzene, the new preparations so obtained are yellow powders, scarcely soluble in alcohol but readily soluble with alkaline reaction in water. From their solutions, when they are poured into diluted hydrochloric acid and sodium carbonate is then added, the diaminodioxyarsenobenzene separates.

The following example illustrates our invention: 6 grams of 3.3¹-diamino-4.4¹-dioxyarsenobenzene dihyrochlorid are added to 60 ccm. of well cooled methyl alcohol. To the solution thus obtained are added 5.05 ccm. of 10 N. caustic soda lye and the whole is shaken until an almost clear liquid is obtained. 1.2 grams of hyraldite C. extra (pure sodium formaldehyde sulfoxylate) dissolved in 3 ccm. of water are then added to the alkaline solution, whereupon the solution becomes turbid and flakes gradually separate, which are however soluble in water. Without having regard to this separation, the liquid is introduced with stirring into a very cold mixture of 300 ccm. of alcohol and 240 ccm. of pure ether. The sodium salt of the arseno compound is thus precipitated in a well-subdivided mixture with sulfoxylate; it is filtered off, washed with absolute ether and pressed out. All these operations are performed as much as possible with exclusion of air, for instance in an atmosphere of nitrogen. Finally the preparation thus obtained is dried *in vacuo* in presence of sulfuric acid. It then forms a light yellow powder, very readily soluble in water with alkaline reaction, but scarcely soluble in alcohol.

Having now described our invention what we claim is:

1. As new products, mixtures of alkali salts of the 3.3¹-diamino-4.4¹-dioxyarsenobenzene with a reducing agent, being yellow powders, readily soluble in water with alkaline reaction, scarcely soluble in alcohol, their solutions separating diaminodioxyarsenobenzene on pouring them into diluted hydrocholoric acid and then adding sodium carbonate.

2. As a new product, a mixture of the sodium salt of 3.3¹-diamino-4.4¹-dioxyarsenobenzene with sodium formaldehyde sulfoxylate, being a yellow powder, readily soluble in water with alkaline reaction, scarcely soluble in alcohol, its solution separating diaminodioxyarsenobenzene on pouring it into diluted hydrocholoric acid and then adding sodium carbonate.

3. The process of preparing a mixture of alkali salts of arsenophenols and sulfoxylates, which consists in precipitating the mixture from a solution of said compounds.

4. The process of preparing a mixture of alkali salts of 3.3¹-diamino-4.4¹-dioxyarsenobenzene and sodium formaldehyde sulfoxylate, which consists in precipitating the mixture from a solution of said compounds.

In testimony whereof, we affix our signatures in presence of two witnesses.

PAUL EHRLICH.
                 BAPTIST REUTER.

Witnesses:
     JEAN GRUND,
     CARL GRUND.